W. L. WAGNER.
VEHICLE ELEVATING AND SUPPORTING DEVICE.
APPLICATION FILED FEB. 28, 1920.
1,389,403.
Patented Aug. 30, 1921.
2 SHEETS—SHEET 2.
Fig. 2.
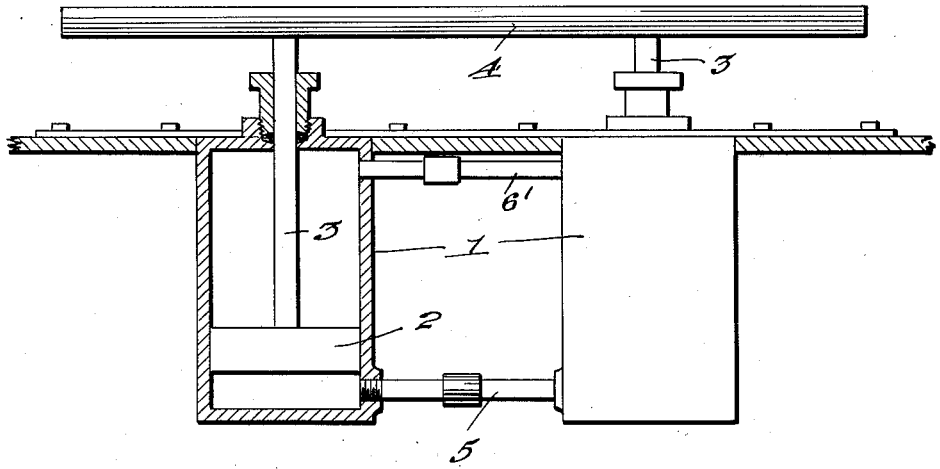
Fig. 4.
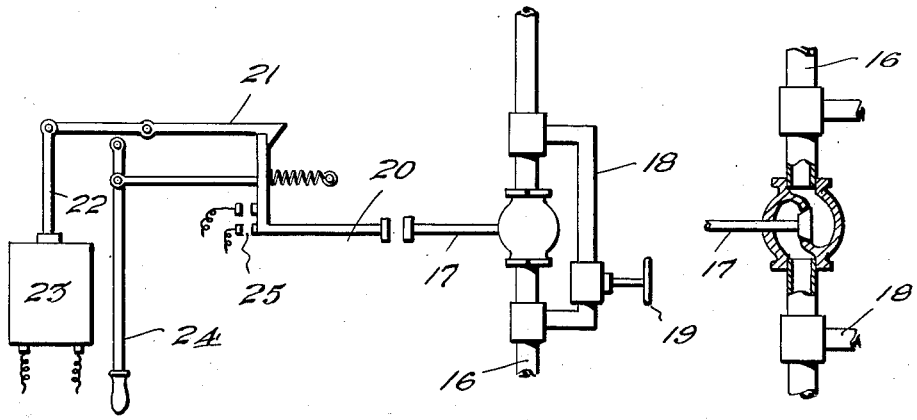
Fig. 3.
Wm. L. Wagner.
INVENTOR
BY Victor J. Evans
ATTORNEY
WITNESS:

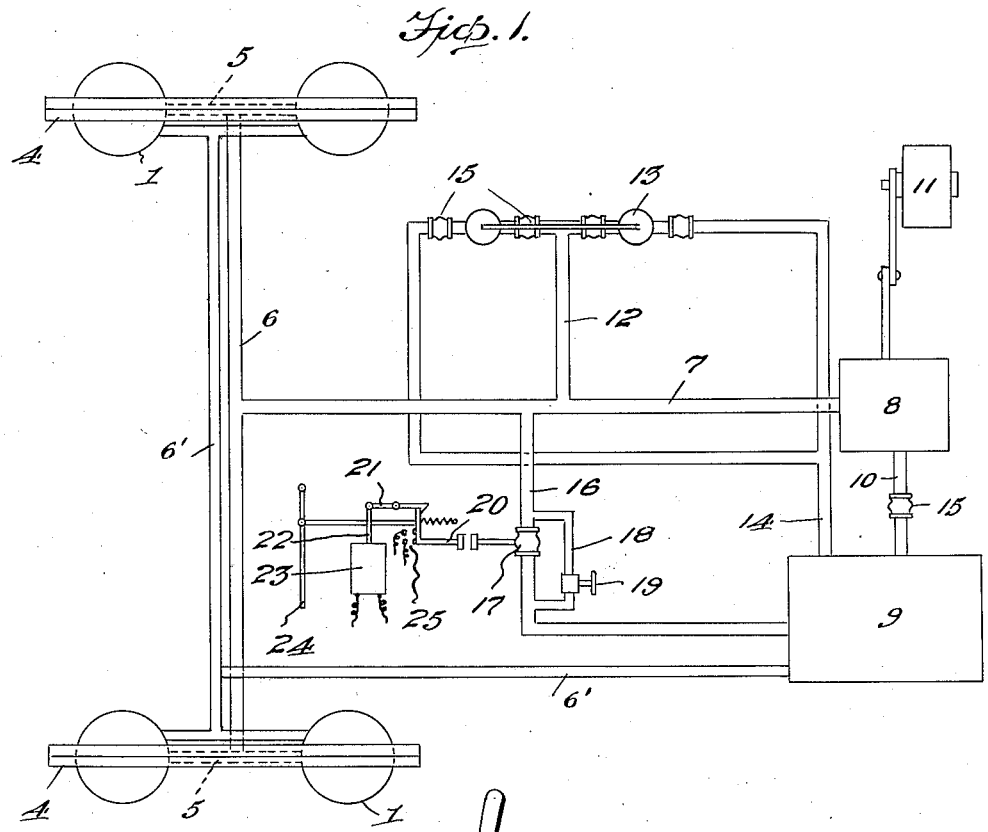
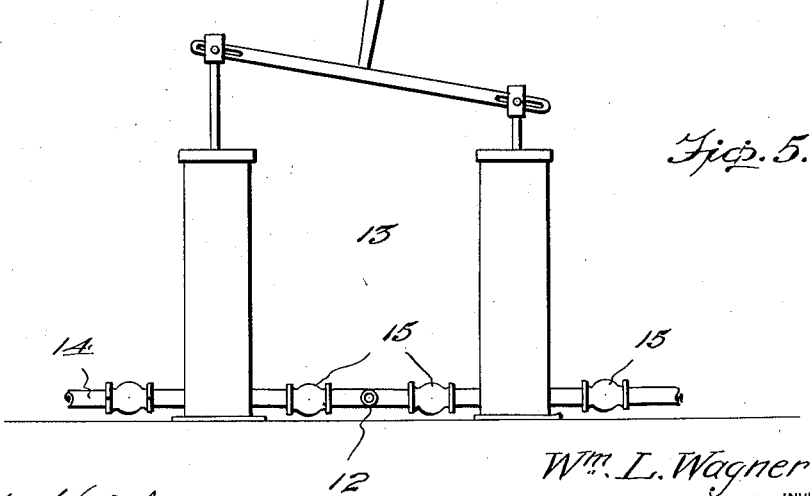

UNITED STATES PATENT OFFICE.

WILLIAM LOUIS WAGNER, OF NORFOLK, VIRGINIA.

VEHICLE ELEVATING AND SUPPORTING DEVICES.

1,389,403.    Specification of Letters Patent.    Patented Aug. 30, 1921.

Application filed February 28, 1920. Serial No. 362,077.

*To all whom it may concern:*

Be it known that I, WILLIAM L. WAGNER, a citizen of the United States, residing at Norfolk, in the county of Norfolk and State of Virginia, have invented new and useful Improvements in Vehicle Elevating and Supporting Devices, of which the following is a specification.

This invention relates to jacks for lifting and supporting fire-engines and similar vehicles and for holding such vehicles with their wheels off the floor so as to save the pneumatic tires of such vehicles from supporting a great weight of the vehicle.

Another object of the invention is to operate the jacks by fluid and to provide a motor driven pump for pumping the fluid to the jacks.

Still another object of the invention is to provide automatic means for releasing the fluid from the jacks when an alarm is turned in.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a diagrammatic plan view showing my invention.

Fig. 2 is a side view of one pair of jacks, parts being shown in section.

Figs. 3 and 4 are detail views showing the alarm controlled valve opening means and the by-pass.

Fig. 5 is a view of the hand operating pump.

As shown in Figs. 1 and 2 the cylinders 1 of the jacks are placed in the floor of the engine house and said cylinders are arranged in pairs, one pair being arranged to support the front axle of the vehicle and the other pair the rear axle. These cylinders have therein the pistons 2, the piston rods 3 of which carry the cradles 4. These cradles are of trough-shape in cross section so as to engage the axles, each cradle being carried by a pair of piston rods. The branch pipe 5 has one end in communication with the lower part of each of the cylinders and the four branch pipes are connected with the pipe 6 and this pipe 6 is connected with a pipe 7 which leads to the pump 8. This pump is connected with the oil tank 9 by the pipe 10. The pump is driven by the motor 11. A branch pipe 12 connects the pipe 7 with a hand pump 13 so that if the main pump or its motor should become deranged the oil may be pumped to the jacks by the hand pump. This hand pump is connected with the oil tank by the pipe 14. As shown this hand pump is provided with a pair of cylinders so that the oil may be pumped very quickly to the jacks. Check valve 15 are located in the pipes wherever necessary. A return pipe 16 is connected with the pipe 7 and with the oil tank so as to permit the oil from the jacks to return to said oil tank. This pipe 16 has a valve 17 therein which is held to its seat by the pressure of oil in the pipe 7. A by-pass 18 is adapted to lead the oil around this valve when the hand valve 19 in said by-pass is open.

The stem of valve 17 is located in the path of the plunger 20 so that when this plunger is released its spring will force it against said valve stem and thus move the valve off its seat so that the oil in the jacks may flow back to the oil tank. This plunger is held in retracted position by a latch member 21 which is connected to the armature 22 of the magnet 23. This magnet is located in the alarm circuit so that when an alarm is turned in the magnet will be energized to attract its armature and thus the latch member will be moved to release the plunger and said plunger will spring forward under its spring tension and open the valve thus permitting the oil in the jacks to flow therefrom back to the tank and thus lower the fire apparatus onto the floor.

A handle 24 is connected with the spring plunger to return the same to its retracted position where it will be engaged by the latch member. Further movement of this handle will close the switch 25 so as to permit current to flow to the motor to actuate the pump to pump the oil into the cylinders of the jacks. The valve 17 will be returned to its seat by the pressure of the oil in the jacks and pipes or a weak spring may be used for returning this valve to its closed position. I prefer to place the handle and the valve for the by-pass on the instrument board of the fire-engine house.

It will thus be seen that when the fire apparatus is not in use it may be raised to place the wheels above the floor so as to relieve the tires of the weight of the vehicle by pumping the oil into the cylinders to raise the cradles. If an alarm should be sounded the releasing valve is automatically opened so as to permit the oil to escape back to the tank and permit the weight of the parts to cause the cradles to descend until the wheels rest upon the floor. Thus the fire apparatus is ready to proceed to the fire by the time the firemen are ready to make the run. If the alarm should fail to work or if the alarm should be sent in by telephone or the like the hand valve 19 is opened to permit the oil to flow through the by-pass.

I connect the upper ends of the cylinders 1 with the upper part of the tank 9 by the pipe line 6' so that the air in the cylinders above the pistons can escape and if any oil should leak past the pistons it will be forced back to the tank.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. An apparatus of the class described comprising lifting jacks for holding the vehicle with its wheels off the floor, means for supplying fluid to said jacks to lift the same and electrically operated means for releasing the fluid from the jacks.

2. An apparatus of the class described comprising lifting jacks for holding the vehicle with its wheels off the floor, means for supplying fluid to said jacks to lift the same, and electrically operated means for releasing the fluid from the jacks, such means constituting a part of the alarm circuit.

3. An apparatus of the class described comprising a series of jacks for holding the vehicle with its wheels off the floor, each jack comprising a cylinder and a piston, pipes connected with said cylinders, a pump connected with the pipes, an oil tank connected with the pump, a return pipe for leading the oil from the cylinders back to the oil tank, a valve controlling said return pipe and means for automatically opening said valve when an alarm is turned in.

4. An apparatus of the class described comprising a series of jacks for holding the vehicle with its wheels off the floor, each jack comprising a cylinder and a piston, pipes connected with said cylinders, a pump connected with the pipes, an oil tank connected with the pump, a return pipe for leading the oil from the cylinders back to the oil tank, a valve controlling said return pipe, means for automatically opening said valve when an alarm is turned in, a by-pass around said valve and a hand operated valve in said by-pass.

5. An apparatus of the class described comprising a series of jacks each consisting of a cylinder and a piston, a cradle connected with each pair of pistons and adapted to engage the axle of the vehicle, pipes connected with said cylinders, an oil tank and a pump connected with said pipes, a return pipe for returning the oil from the cylinders to the oil tank, a valve in said pipe and means for opening said pipe when an alarm is turned in.

6. An apparatus of the class described comprising a lifting jack comprising a cylinder and a piston therein, means for forcing oil to said cylinder to raise the piston, means for releasing the oil from the cylinder and hand operated means for controlling the releasing means and for controlling the operation of the delivery means.

In testimony whereof I affix my signature.

WILLIAM LOUIS WAGNER.